United States Patent Office 3,372,990
Patented Mar. 12, 1968

3,372,990
CYCLIC PROCESS FOR MANUFACTURING HYDROGEN PEROXIDE
Michel Charret, Champ-sur-Drac, France, assignor to Oxysynthese, Paris, France
No Drawing. Filed Mar. 26, 1965, Ser. No. 443,092
Claims priority, application France, Apr. 16, 1964, 971,147, Patent No. 1,405,861
7 Claims. (Cl. 23—207)

ABSTRACT OF THE DISCLOSURE

The present disclosure relates to a process for manufacturing hydrogen peroxide by reducing a quinone compound and oxidizing the resultant hydroquinone compound, and separating the hydrogen peroxide formed. The process involves the introduction into the working solution of an aqueous solution of an acid pyrophosphate of an alkali metal, particularly disodium acid pyrophosphate. Preferably, ammonium nitrate is also needed.

---

This invention concerns an improvement in the oxidation yield and the inhibition of corrosion of aluminium in the presence of the oxidised phase in the process for manufacturing hydrogen peroxide by oxidation and reduction of quinones.

The process which uses anthraquinone for manufacture of hydrogen peroxide consists of a cyclic operation comprising the hydrogenation, in the presence of a catalyst, of anthraquinones dissolved in solvents, to form anthrahydroquinones. Then the hydroquinones are oxidised to quinones, with formation of hydrogen peroxide. This hydrogen peroxide is extracted by washing the oxidised solution with water.

Hydrogenation of the anthraquinone to anthrahydroquinone also gives rise to side reactions, the principal one being the formation of tetrahydroanthraquinone.

The tetrahydroanthraquinones participate in the hydrogenation reactions and give tetrahydroanthrahydroquinones with a hydrogenation rate higher than that of the anthraquinones and with formation of hydrogen peroxide by oxidation in air of the tetrahydroanthrahydroquinones, the oxidation rate of which is lower than that of the anthrahydroquinones; this is revealed in industrial practice by a loss of oxidation efficiency bringing with it a decrease in the hydrogen peroxide production capacity of the plant.

Several processes have been advocated to combat the undesirable influence of the tetrahydroanthraquinones by increasing their oxidation rate; for example, French Patent No. 1,240,174, of Oct. 5, 1959, describes a process characterised in that the oxidation is carried out the presence of a mineral alkaline substance soluble in water, German Patent No. 1,144,240 of Aug. 30, 1961, proposes the addition of phosphoric acid to the working solution in front of the inlet of the oxidiser, American Patent No. 3,126,257 of Aug. 2, 1961, proposes the addition of phosphoric acid to the extraction water. These processes have not enabled the hydrogen peroxide yield to be increased to any very significant extent.

The present invention concerns a more effective improvement which brings about simultaneously an increase in the hydrogen peroxide production capacity, stabilisation of the oxidised phase, and suppression of the corrosion of aluminium equipment in contact with this phase.

This improvement is characterised in that an aqueous solution of an acid pyrophosphate of an alkali metal, preferably disodium pyrophosphate, is introduced into the working solution.

According to one preferred implementation of the invention, the aqueous solution of disodium pyrophosphate contains an alkali nitrate, or ammonium nitrate and this solution is introduced at the inlet of the oxidiser; a second injection can be made at the outlet of the oxidiser.

The process of the invention increases the hydrogen peroxide production capacity by improving the oxidation yield and by reducing decomposition of the oxidised phase in the oxidiser through stabilisation of this oxidised phase. The introduction of disodium phosphate and ammonium nitrate into the working solution at the inlet of the oxidiser performs this double role.

It has been found taht injection of an aqueous solution of disodium phosphate and ammonium nitrate into the working solution at the outlet of the oxidiser completely inhibited corrosion of the aluminium equipment and pipelines situated behind the oxidiser.

Furthermore, the process of the invention offers a new and equally appreciable advantage in that it reduces the carbon content of the hydrogen peroxide extracted. Indeed, it is known that the active oxygen arising from the decomposition of the hydrogen peroxide reacts on the solvents to give water-soluble compounds. Stabilisation of either the oxidised organic phase or the hydrogen peroxide leads to a reduction in the carbon content of the hydrogen peroxide produced.

The acid pyrophosphate of an alkali metal preferably used is disodium pyrophosphate, $P_2O_7Na_2H_2$. The composition of the aqueous solution of disodium pyrophosphate and ammonium nitrate, injected into the working solution, is between 1.5 and 25 g. per litre for disodium pyrophosphate, and between 0.2 and 10 g. per litre for ammonium nitrate.

This solution is introduced into the organic solution at the inlet of each oxidiser by means of proportioning pumps in such a way that the concentration of products per $m.^3$ of working solution is:

0.15–2.5 g. for disodium pyrophosphate, and
0.02–1 g. for ammonium nitrate.

The second introduction of the stabilising and inhibiting solution is made at the outlet of each oxidiser, in the same proportions as above at the inlet of the oxidisers.

The following example illustrates the invention without restricting it:

Example

When a working solution containing:

50–55% by volume of methyl cyclohexyl acetate,
45–50% by volume of aromatic hydrocarbons,
11–24 g./l. ethyl anthraquinone,
43–61 g./l. tetrahydroethylanthraquinone, and
21–30 g./l. degradation products is subjected to hydrogenation, then oxidation by air lasting between 15 and 35 minutes, the volumes of air introduced per $m.^3$ oxidised solution being between 25 and 52 $m.^3$, the hydrogen peroxide content of the organic solution is 5–9 g. per litre. The oxidation yield is 87%, and the decomposition of the oxidised phase measured between the inlet and the outlet of the oxidisers is 3%.

In a series of comparative operations carried out under the same working conditions of the solution, that is to say for the same flow rate and the same hydrogen peroxide equivalent at hydrogenation, and with the same temperature regime, an aqueous solution containing 5 g. per litre disodium pyrophosphate ($P_2O_7Na_2H_2$) and 2 g. per litre ammonium nitrate is introduced into the solution to be treated at the inlet of the oxidiser. This injection is carried out by means of proportioning pumps, in a quantity such that the concentration of the stabilising products per $m.^3$ of organic solution is 0.5 g. for the disodium acid pyrophosphate and 0.2 g. for the ammonium nitrate.

Oxidation of the working solution is carried out under the same conditions as in the preceding test. An increase in the oxidation yield from 87% to 90% is determined, i.e. an improvement of 3%.

The introduction of the aqueous solution of disodium pyrophosphate and ammonium nitrate at the inlet of the oxidisers also increases the hydrogen peroxide production capacity by reducing the decomposition of the oxidised phase. This decomposition, measured between the inlet and the outlet of the oxidisers, is now only 2%, whereas it attained 3% in the test involving no introduction of stabiliser solution.

This decomposition of the oxidised phase can be reduced to 1–1.5% under certain conditions of operation.

After the oxidation operation, a second injection of the aqueous solution of disodium pyrophosphate and ammonium nitrate is carried out at the outlet of each oxidiser, in the same proportions as previously at the inlet of the oxidisers.

Corrosion of the aluminium was extremely serious before the introduction of the inhibiting solution. It appeared in the form of rapid pitting of the aluminium. The entrained alumina was partly recovered on the filter, which became clogged up so quickly that it had to be cleaned every day. The remainder of the alumina caused blocking of the holes in the plates of the extraction columns, making it impossible for the latter to operate normally. On several occasions it was even necessary to stop the operation of the plant in order to clean the plates.

After the solution of sodium acid pyrophosphate and ammonium nitrate had been introduced at the outlet of the oxidisers, corrosion of aluminium disappeared completely. After several months of operation there has been no clogging of the filter nor blocking of the holes in the plates of the extraction columns. This very considerable improvement, which is of great industrial interest is due to the double role of stabiliser and inhibiter performed by the aqueous solution according to the invention. The fact is that separation of water and, in consequence, of hydrogen peroxide takes place at the outlet of the oxidiser. If this hydrogen peroxide is not stabilised it decomposes readily and the active oxygen attacks the aluminium and corrodes it. The disodium pyrophosphate performs the role of a stabiliser of the hydrogen peroxide in the aqueous phase, and the ammonium nitrate performs the role of a corrosion inhibitor.

What I claim is:

1. A process for manufacturing hydrogen peroxide which comprises reducing a quinone compound, oxidising the resulting hydroquinone compound, separating the hydrogen peroxide formed, and introducing into the organic working solution at the inlet of the oxidiser an aqueous solution of disodium acid pyrophosphate containing ammonium nitrate to stabilize the resultant reaction products within the oxidizer.

2. The process of claim 1 in which the content of the aqueous solution of disodium pyrophosphate and ammonium nitrate is between about 1.5 and about 25 g. per litre for the disodium pyrophosphate and between about 0.2 and about 10 g. per litre for the ammonium nitrate.

3. The process of claim 2 in which the aqueous solution of disodium pyrophosphate and ammonium nitrate is introduced into the working solution in such a quantity that the concentration of the disodium pyrophosphate is between about 0.15 and about 2.5 per m.$^3$ and that the concentration of the ammonium nitrate is between about 0.02 and about 1 g. per m.$^3$ of working solution.

4. A process for manufacturing hydrogen peroxide in an organic working solution which comprises reducing a quinone compound, oxidising the resulting hydroquinone compound, separating the hydrogen peroxide formed and introducing into the organic working solution between the reducing step and the oxidation step an aqueous solution of an acid pyrophosphate of an alkali metal to stabilize the resultant reaction products within the oxidizer.

5. A process for manufacturing hydrogen peroxide in an organic working solution which comprises reducing a quinone compound, oxidising the resulting hydroquinone compound, separating the hydrogen peroxide formed, and introducing into the organic working solution between the reducing step and the oxidation step to stabilize the resultant reaction products within the oxidizer and between the oxidation step and the separation step to inhibit downstream corrosion an aqueous solution of an acid pyrophosphate of an alkali metal.

6. A process for manufacturing hydrogen peroxide in an organic working solution which comprises reducing a quinone compound, oxidising the resulting hydroquinone compound, separating the hydrogen peroxide formed and introducing into the organic working solution between the reducing step and the oxidation step and between the oxidation step and the separation step an aqueous solution of disodium acid pyrophosphate containing ammonium nitrate.

7. In a process for the manufacture of hydrogen peroxide comprising the steps of reducing a quinone compound, oxidizing the resulting hydroquinone compound and separating the hydrogen peroxide formed, the improvement comprising introducing into the organic working solution at the inlet of the oxidizer an aqueous solution of an acid pyrophosphate of an alkali metal to stabilize the resultant reaction products within the oxidizer.

References Cited

UNITED STATES PATENTS

| | | | |
|---|---|---|---|
| 2,904,517 | 9/1959 | Baker | 23—207.5 |
| 3,073,755 | 8/1960 | Banfield et al. | 23—207 |
| 3,098,714 | 7/1963 | Kabisch et al. | 23—207 |

EDWARD J. MEROS, *Primary Examiner.*

OSCAR R. VERTIZ, *Examiner.*

H. S. MILLER, *Assistant Examiner.*